No. 813,186. PATENTED FEB. 20, 1906.
J. WARRINGTON.
STEERING GEAR FOR AUTOMOBILES.
APPLICATION FILED JUNE 29, 1904.
2 SHEETS—SHEET 1.
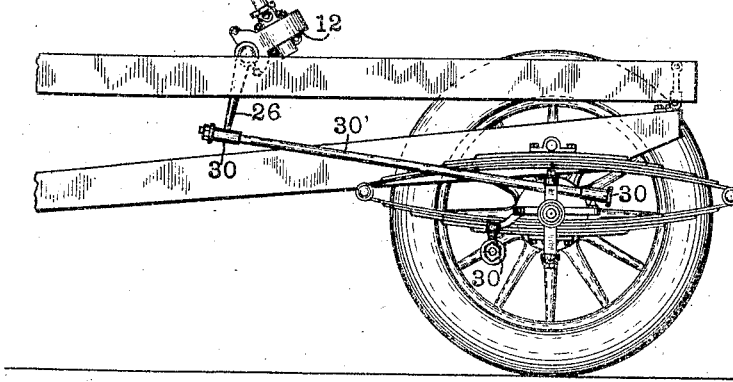
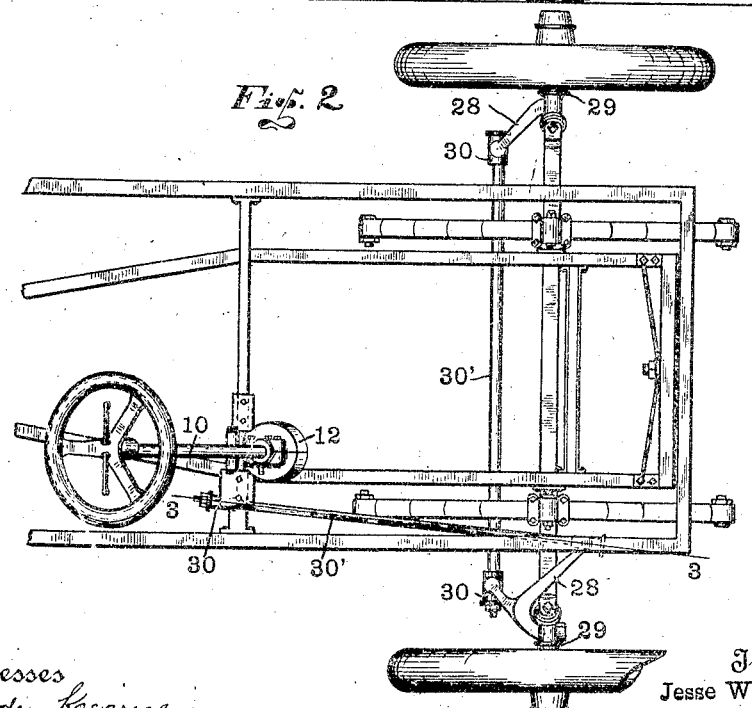
Witnesses
Adelaide Kearns
J. A. Walsh
Inventor
Jesse Warrington.
By
Bradford Hood
Attorneys

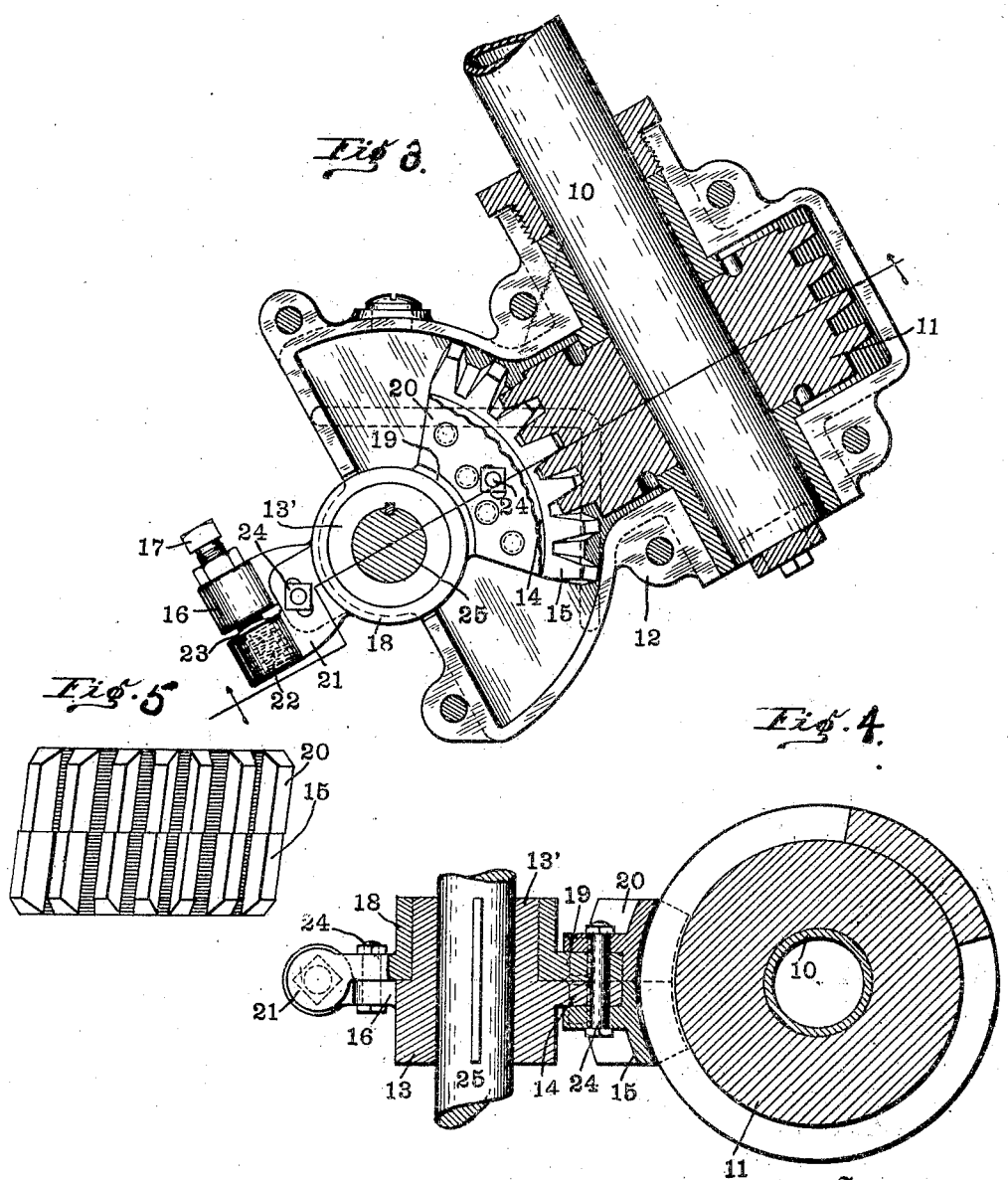

UNITED STATES PATENT OFFICE.

JESSE WARRINGTON, OF INDIANAPOLIS, INDIANA, ASSIGNOR TO NORDYKE & MARMON COMPANY, OF INDIANAPOLIS, INDIANA, A CORPORATION OF INDIANA.

STEERING-GEAR FOR AUTOMOBILES.

No. 813,136.  Specification of Letters Patent.  Patented Feb. 20, 1906.

Application filed June 29, 1904. Serial No. 214,579.

*To all whom it may concern:*

Be it known that I, JESSE WARRINGTON, a citizen of the United States, residing at Indianapolis, in the county of Marion and State of Indiana, have invented certain new and useful Improvements in Steering-Gear for Automobiles, of which the following is a specification.

In the operation of automobiles it is necessary that there be practically no lost motion between the steering-handle and the pivoted wheels in order that the driver may have absolute control of the vehicle.

The object of my present invention is to provide intermediate connections between the steering-handle and the wheels of such character that all wear of parts may be readily adjusted in order that the connections may at all times be free from lost motion.

The accompanying drawings illustrate my invention.

Figure 1 is a side elevation of the main frame of an automobile provided with my improved steering apparatus, the nearest forward wheel being omitted. Fig. 2 is a plan of the parts shown in Fig. 1. Fig. 3 is a vertical detail of the connection between the steering-handle shaft and the first lever. Fig. 4 is a section on line 5 5 of Fig. 3, and Fig. 5 is a detail of the adjustable worm-wheel.

In the drawings, 10 indicates the steering-shaft, and 11 a worm of ordinary construction suitably secured thereto, the shaft 10 being mounted in suitable bearings in a casing 12, which also incloses the worm 11 and the parts now to be described. It has heretofore been customary to mesh with the worm a segmental worm-gear of ordinary construction; but unless provision is made for taking up wear of these two parts there is considerable lost motion after a short period of use, and provision has heretofore usually been made by which the distance between centers could be adjusted in order to take up this lost motion. In my present construction the distance between centers remains fixed and the lost motion is taken up in the following manner. Mounted within the casing 12 is a hub member 13, provided at one side with a segmental flange 14, to which is secured a worm-wheel segment 15. Projecting from the opposite side of hub 13 is an arm 16, which carries a threaded adjusting-bolt 17, lying at right angles to the axis of the hub. Rising above the upper face of the flange 14 and arm 16 is a central boss 13', which forms part of the hub 13. Sleeved upon this boss 13' is a second hub member 18, provided at one side with a segmental flange 19, corresponding exactly to the flange 14, and riveted or otherwise suitably secured to this flange is a worm-wheel segment 20 of the same character as the segment 16 and mating therewith, the plane of junction between the two worm-wheel segments being preferably arranged radially with relation to the shaft 10. Hub 18 carries also an arm 21, adapted to coöperate with the arm 16. Arm 21 is provided with a bore in line with adjusting-screw 17, and arranged in this bore is a cushioning-spring 22, (see dotted lines, Fig. 3,) provided with a cap 23, arranged to be engaged by the inner end of adjusting-screw 17. In order to hold the two parts together, I provide a pair of bolts 24, which pass through suitable slotted openings formed through the arms 16 and 21 and through the flanges 14 and 19.

In operation any lost motion may be taken up by an adjustment of the screw 17, thus swinging the two worm-wheel segments 16 and 20 and offsetting the teeth of one segment with relation to the other, as clearly shown in Fig. 5. The greatest wear takes place of course at about the middle of the worm-wheel segments, and after this wear is taken up by offsetting the teeth there would be a possibility of cramping the worm in the worm-wheel segments if for any reason a movement of the steering mechanism greater than customary is desired. With the construction shown, however, as soon as the worm 11 is forced between teeth which are offset too much the two segments will yield by reason of the cushion 22, and the operation of this portion of the device becomes as free and easy as any other portion.

I claim as my invention—

1. In a steering-gear, the combination, with the steering-shaft and worm carried thereby, of a worm-segment meshing with said worm and consisting of a pair of mating toothed segments angularly adjustable relatively to each other, an inclosing casing for said parts, and adjustable means accessible from the exterior of said casing for yieldingly holding said mating segments in various positions of relative angular adjustment.

2. In a steering-gear, the combination, with the steering-shaft and worm carried thereby, of a second shaft, a worm-segment carried by said second shaft and meshing with said worm, said segment consisting of a pair of mating toothed members, one attached to said shaft and the other angularly adjustable about the shaft, each of said members provided with a portion projecting from the shaft opposite from the toothed portions thereof, a yielding buffer carried by one of said projections, and a coöperating part carried by the other of said projections.

3. In a steering-gear, the combination, with the steering-shaft and worm carried thereby, of a second shaft, a worm-segment carried by said second shaft and meshing with said worm, said segment consisting of a pair of mating toothed members, one attached to said shaft and the other angularly adjustable about the shaft, each of said members provided with a portion projecting from the shaft opposite from the toothed portions thereof, a yielding buffer carried by one of said projections, a coöperating part carried by the other of said projections, and an inclosing casing inclosing the worm and the segments.

4. In a steering-gear, the combination, with the steering-shaft and the worm carried thereby, of a second shaft, a toothed worm-segment attached to said second shaft and provided with an arm projecting away from the toothed portion, a second mating toothed section journaled upon the first toothed section, and also provided with an arm projecting away from the toothed portion and lying adjacent the similar arm of the first segment, an adjustable abutment carried by one of said arms, and a yielding buffer carried by the other of said arms, all substantially as and for the purpose set forth.

5. In a steering-gear, the combination, with the steering-shaft and the worm carried thereby, of a second shaft, a toothed worm-segment attached to said second shaft and provided with an arm projecting away from the toothed portion, a second mating toothed section journaled upon the first toothed section, and also provided with an arm projecting away from the toothed portion and lying adjacent the similar arm of the first segment, an adjustable abutment carried by one of said arms, a yielding buffer carried by the other of said arms, and an inclosing casing inclosing the worm and toothed portions of the worm-segment, all substantially as and for the purpose set forth.

In witness whereof I have hereunto set my hand and seal, at Indianapolis, Indiana, this 27th day of June, A. D. 1904.

JESSE WARRINGTON. [L. s.]

Witnesses:
ARTHUR M. HOOD,
JAMES A. WALSH.